Dec. 25, 1951   E. W. GOEBEL ET AL   2,580,018
MOTOR HANDLING DEVICE
Filed Oct. 5, 1946

INVENTORS
ELMER W. GOEBEL
GUSTAV F. KURZ
BY John K. Cassidy
ATTORNEY

Patented Dec. 25, 1951

2,580,018

UNITED STATES PATENT OFFICE 2,580,018

MOTOR HANDLING DEVICE

Elmer W. Goebel and Gustav F. Kurz,
St. Louis, Mo.

Application October 5, 1946, Serial No. 701,606

5 Claims. (Cl. 212—75)

This invention pertains to motor handling devices for automotive trucks and more particularly to apparatus for the removal and replacement of engines in cab-over-engine style of trucks.

The object of the invention is to provide a motor handling device for cab-over-engine trucks that is simple in operation, requires a minimum of manpower, and a minimum amount of equipment so as to facilitate the handling of engines on the road as well as in the shop.

Another object of the invention is to provide a motor handling device that is simple in construction, durable in operation and can be manufactured cheaply.

Figure 1:
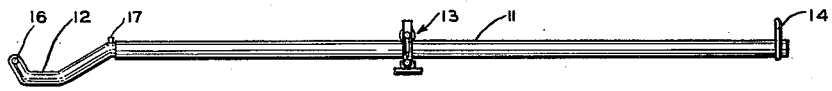
Figure 2:
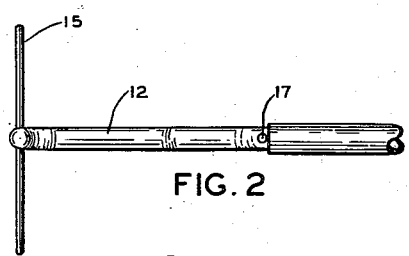
Figure 3:
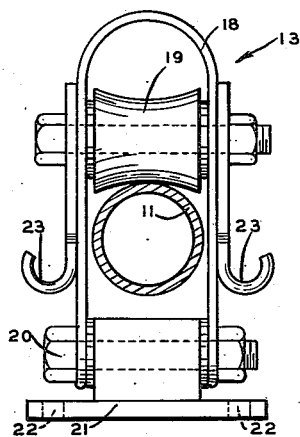
Figure 4:
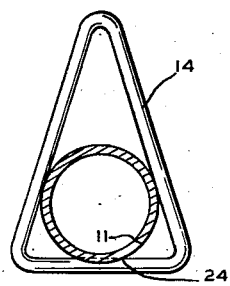
Figure 5:
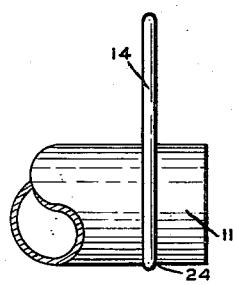
Figure 6:
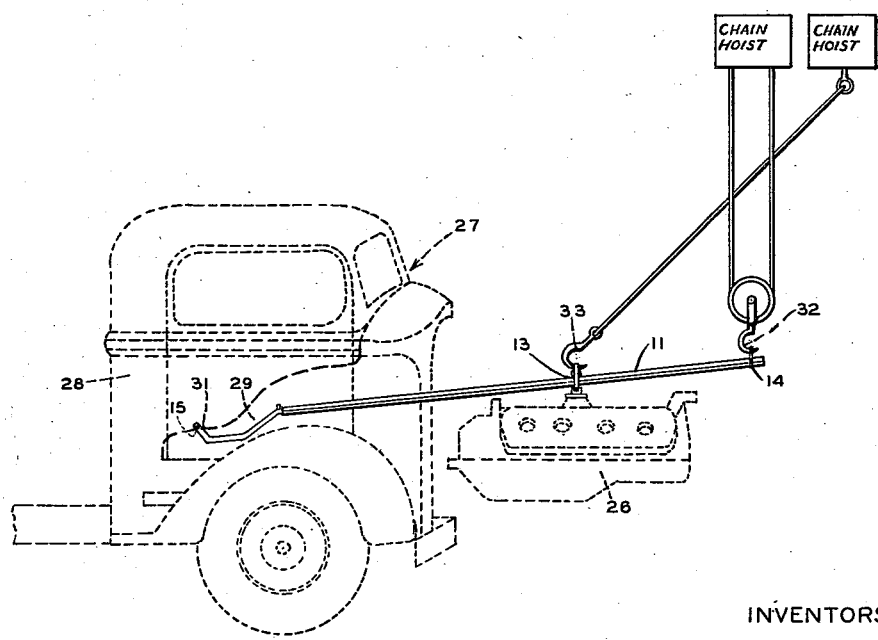

Other objects and advantages of the invention will become apparent from the following detailed description, when taken in connection with the accompanying drawing, in which Fig. 1 is a side view of a device embodying the invention, Fig. 2 is a plan view of an anchoring means for the device, Fig. 3 is a detailed end view of a roller block attaching assembly, Figs. 4 and 5 are detailed end and side views, respectively, of a removable bail forming a part of the device, Fig. 6 is a descriptive sketch illustrating the device in use.

As is well known in the art, the handling of engines in the cab-over-engine type of truck requires special methods of procedure since the same methods used in handling engines of the conventional hooded trucks cannot be resorted to. The handling of these engines, in brief, requires that the engine be removed or installed horizontally rather than vertically as in the conventional truck. This is due to the restrictions placed on the amount of space above the engine. Thus, it becomes a laborious and tedious task, requiring the service of three or four mechanics to remove an engine. To overcome this, special handling devices have been proposed. Of these, the most successful has been a carriage on which is mounted a track capable of being raised or lowered. In use, this device is moved to a position in front of the truck so that the track will extend inwardly over the block assembly of the truck engine. By means of a block attaching member, which is mounted on the track, the engine is raised off of its mountings and moved horizontally by moving the carriage away from the truck body until it is clear of the automotive trucks. Although commercially successful, this device is nevertheless costly, and due to its weight, it is not portable, and therefore, it is only adaptable to use in a shop.

In the instant invention, the device that is provided is inexpensive to manufacture and is adaptable to road as well as shop use. As is illustrated in the drawings, this device comprises an elongated track 11, an anchoring means 12, a removable block attaching means 13 and a removable bail 14.

The anchoring means 12 is anchored to any convenient portion of the truck body by a rod 15 (Fig. 2) which is passed through a hole 16 (Fig. 1) in the end of the member 12, and rests on a portion of the truck body. A pin or stop means 17, brazed to the member 12, is provided to keep the block attaching means 13 from slipping from the elongated track 11 onto the anchoring means 12.

The block attaching means 13, as shown in Fig. 3, comprises, in part, a U-shaped frame 18 holding a metal roller 19 which is bearinged to ride on the elongated track 11, and a bolt 20 connecting a swivel plate 21 to the frame. The plate 21 his drilled holes 22 spaced to receive bolts for rigidly attaching the assembly 13 to the engine of the automotive truck. As an alternate method of engaging an automotive engine to the block attaching means 13, two hooks 23 are provided for receiving chains or wire rope affixed to the automotive block.

The free end of the elongated track is recessed at 24 to receive the triangularly shaped removable bail 14 (Figs. 4 and 5) which has a round cross section.

Although the device is adapted for any cab-over-engine type of truck, an example of the operation of the device will be shown with a Ford V-8 type of cab-over-engine truck. This use may be thought of as being typical. It is to be understood, however, that this device is not limited to use with any particular type or class of trucks or automobiles.

As to the stated example, with particular reference being made to Fig. 6, a motor block assembly 26 has been removed from the truck 27. The cab 28, in this instance, has a housing 29 through which the anchoring means is secured through the engine lubricating oil filler hole 31.

After all of the necessary parts of the truck body and engine, such as the radiator, radiator grill, carburetor, and oil filler tube have been removed, the clutch housing is then removed from the transmission along with all of the engine's electrical connections. The anchoring means 12 is then passed through the lubricating oil filler hole 31 and is secured to the housing 29 by passing the rod 15 through the anchoring hole 16 to pivotally anchor the track 11. After the track is anchored, the block attaching means is then slipped over the track 11 in such a manner that the roller 19 rides on the track 11.

Next, the block attaching assembly 13 is moved into position with the drilled holes 22 of the swivel plate 21 placed so as to receive bolts which will rigidly secure the motor block assembly of the truck. The cooperating ball 14 is then placed into position on the track 11 where it rests in the recess 24.

After the device has been positioned for use thusly, a first chain hoist is employed to elevate the track 11 vertically and a second chain hoist may or may not be used to pull the engine from the cab of the truck. In shop use, at least two of these chain hoists are available and are generally used. In such practice, a hook 32 of the first hoist's tackle is inserted in the removable bail 14 and the track is elevated vertically by this hoist. A tackle hook 33 of the second hoist is inserted in the frame 18 of the block attaching means 13, and by means of this second hoist, the truck engine 26 is moved horizontally along the track 11 out of the truck cab 27 until the second hoist carries the load of the engine 26. Thereafter, the hook 32 of the first chain hoist is removed from the bail 14, the bail is removed from the track 11, and the motor attaching assembly 13, together with the truck engine 26, is swung free of the track 11 with the second hoist only supporting the engine. Next, the anchor rod 15 is removed and the track 11 is withdrawn from the truck for use elsewhere in the shop.

In a shop where several hoists are available, two tracks together with their anchoring means and removal bails could serve for the removal or installation of several engines, since all that would be required would be a block attaching means for each engine.

For road service, the first hoist generally takes the form of a crane usually mounted on auto-wrecker trucks. In this use, the crane would be used to elevate the track and support the engine. The motor would be moved manually along the track by pushing or pulling the same. This method of moving the motor may also be resorted to in a shop, and for that matter no hoist at all is absolutely needed.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a motor handling device, the combination comprising an elongated track, a hooked anchoring member with an opening in one end thereof attached to one end of said elongated track, an anchor rod insertable in said opening, a block attaching means movable along said track and a removable bail attachable to the other end of said track.

2. A device as claimed in claim 1, including a stop means fixed to said hooked anchoring member at its juncture with said track for preventing said block attaching means from moving off of said track onto said hooked anchoring member.

3. In a device for handling a motor of a cab-over-engine truck, the combination of a rigid track, means for pivotally anchoring one end of said track in the frame work of said truck, and a block holding means movable along said track comprising a frame, a roller carried in said frame and movable on said track, and a swivel plate pivotally connected to said frame and having holes therein for receiving bolts with which said plate is connected to the block of said motor.

4. In a motor handling device for cab-over-engine trucks, the improvement comprising an elongated track, a movable block attaching means riding along said track, a removable bail positioned at one end of said track, means adapted to engage said bail for raising and lowering said track with relation to the horizontal, anchoring means on the other end of said track for pivotally mounting the same on a support, and a stop means secured to the anchoring means for preventing the movable block attaching means from moving from the elongated track onto said anchoring means.

5. A device of the character described for handling a truck motor, comprising, a portable track, means attachable to said track at one end thereof for supporting that end on the truck frame, block-attaching means supported on and movable along said track, bail means engageable with the other end of said track for attachment thereto of hoisting means to lift said latter end whereby a high leverage ratio may be applied to lift the motor from its seat, and means on said block-attaching means adapted for the attachment of haulage means whereby said block-attaching means with the motor suspended therefrom may be hauled outward along said track to remove the motor from the truck.

ELMER W. GOEBEL.
GUS F. KURZ.

REFERENCES CITED

The following references are of record in the file of this patent:

UNITED STATES PATENTS

| Number | Name | Date |
|---|---|---|
| 425,701 | Rohm | Apr. 15, 1890 |
| 524,862 | Ogilvie | Aug. 21, 1894 |
| 703,444 | Murphy | July 1, 1902 |
| 809,618 | Keech | Jan. 9, 1906 |
| 1,365,220 | Bishard | Jan. 11, 1921 |
| 1,566,827 | Chilson | Dec. 22, 1925 |